(12) United States Patent
Jobin et al.

(10) Patent No.: US 7,080,904 B2
(45) Date of Patent: Jul. 25, 2006

(54) ONE PIECE SPECTACLE WITH TEMPLE PRE-LOAD

(75) Inventors: Michael J. Jobin, Boston, MA (US); Gregor Mittersinker, Warwick, MA (US); Paul V. Maxted, Bedford, MA (US); Brian J. Matt, Wellesley, MA (US)

(73) Assignee: Bacou-Dalloz Eye and Face Protection, Inc., Smithfield, RI (US)

( * ) Notice: Subject to any disclaimer, the term of this patent is extended or adjusted under 35 U.S.C. 154(b) by 0 days.

(21) Appl. No.: 10/908,692

(22) Filed: May 23, 2005

(65) Prior Publication Data

US 2005/0275795 A1 Dec. 15, 2005

Related U.S. Application Data

(60) Provisional application No. 60/575,178, filed on May 28, 2004.

(51) Int. Cl.
*G02C 5/22* (2006.01)

(52) U.S. Cl. .......................... 351/153; 351/41; 351/44; 16/228

(58) Field of Classification Search ................. 351/41, 351/44, 153; 16/228
See application file for complete search history.

(56) References Cited

U.S. PATENT DOCUMENTS

| 2,975,426 | A |   | 3/1961  | Rabb ................................ 2/13 |
| 3,756,704 | A |   | 9/1973  | Marks .......................... 351/60 |
| 4,018,515 | A |   | 4/1977  | Derkas ......................... 351/47 |
| 4,822,161 | A |   | 4/1989  | Jimmy ....................... 351/158 |
| 4,898,460 | A |   | 2/1990  | Magninat et al. ........... 351/114 |
| 5,059,017 | A | * | 10/1991 | Bennato ..................... 351/121 |
| 5,760,868 | A |   | 6/1998  | Jannard et al. ............. 351/153 |
| 5,825,452 | A |   | 10/1998 | Spector ....................... 351/46 |
| 5,828,436 | A |   | 10/1998 | Lester ......................... 351/41 |
| 5,862,530 | A |   | 1/1999  | Shillington .................... 2/439 |
| 5,940,892 | A |   | 8/1999  | Morgan ........................ 2/430 |
| 6,082,857 | A |   | 7/2000  | Lockhart .................... 351/178 |
| 6,435,680 | B1 |  | 8/2002  | Lockhart ...................... 351/83 |
| 6,994,434 | B1 | * | 2/2006 | Blanchette et al. ......... 351/110 |

FOREIGN PATENT DOCUMENTS

GB 2218824 A 11/1989

* cited by examiner

*Primary Examiner*—Huy Mai
(74) *Attorney, Agent, or Firm*—Barlow, Josephs & Holmes, Ltd.

(57) ABSTRACT

The disposable safety eyewear has a lens portion having a bridge portion and a nose support thereon. Left and right temple bars are connected to the lens portion by living hinges. The living hinges are operable between an open position and a folded position. Mating formations secure the living hinges in its respective folded position.

23 Claims, 12 Drawing Sheets

SEE FIG. 4A

ONE PIECE SPECTACLE WITH TEMPLE PRE-LOAD

CROSS-REFERENCE TO RELATED APPLICATION

This application claims priority to earlier filed U.S. Provisional Application Ser. No. 60/575,178, filed Mar. 28, 2004, the contents of which are incorporated herein by reference.

BACKGROUND OF THE INVENTION

1. Field of the Invention

The instant invention relates to safety eyewear and more particularly to inexpensive safety eyewear that can be thrown away after use.

2. Background of the Related Art

Inexpensive disposable safety eyewear has particular appeal to companies that must routinely give out safety eyewear to guests visiting or touring manufacturing facilities.

Growing awareness of eye safety and the implementation of regulations requiring the use of safety eyewear by all persons within manufacturing facilities have prompted development of a variety of inexpensive safety eyewear products. In particular, disposable safety eyewear has recently become a significant sales market for companies that must routinely give out safety eyewear to guests visiting their facilities or touring the manufacturing floor.

Therefore, there is a need for an inexpensive and disposable safety eyewear product.

SUMMARY OF THE INVENTION

The instant invention provides a simple and inexpensive one-piece, injection-molded, disposable safety eyewear product that does not require any assembly prior to shipment to the customer.

Briefly, the entire eyewear is molded in a substantially flat configuration as a single piece having the lens portion, side shield portion and temple bars integrally connected by reduced thickness parting lines that define living hinges. The adjacent edges of the lens portion and side shield portion are integrally molded with one-way, snap-in-place mating formations such that when the side shields are pivoted toward the lens along the living hinges, the mating formations snap together to lock the side shields in place relative to the lens. Likewise, the adjacent edges of the temple bars and the side shield also include snap-in-place mating formations such that when the temple bars are pivoted towards the side shield, the mating formations snap together to lock the temple bars in place relative to side shields. The mating formations snap together in a single direction, and are not intended to be snapped apart after use. Once snapped together, the eyewear is intended to be thrown away after use.

The one-piece design permits the safety eyewear to be molded in a single shot, packaged in a flat low-profile box, and shipped without any assembly or subsequent processing steps by the manufacturer. At the point of distribution of the eyewear, the user removes the eyewear from the box, rotates the side shields and temple bars into place, snapping the mating formations together to form a conventional pair of safety eyewear.

A second embodiment of the one-piece design includes a lens portion and temple bars each integrally connected to the lens portion by a plurality of closely-spaced, parallel reduced-thickness parting lines formed at the junction areas between the lens portion and the temple bars. The plurality of parting lines form living hinges that allow the temple bars to be bent in an arc to a perpendicular to the lens portion. The junction areas at each temple are also provided with snap-in place mating formations that snap together when the temple bars are bent relative to the lens portion.

Accordingly, among the objects of the instant invention are:

the provision of a one-piece disposable safety eyewear that is simple and inexpensive to manufacture; and the provision of a one-piece safety eyewear including snap-in-place mating formations that lock the eyewear components in place when folded along integrally formed living hinges.

Other objects, features and advantages of the invention shall become apparent as the description thereof proceeds when considered in connection with the accompanying illustrative drawings.

BRIEF DESCRIPTION OF THE DRAWINGS

In the drawings which illustrate the best mode presently contemplated for carrying out the present invention.

DESCRIPTION OF THE PREFERRED EMBODIMENT

Figure 1:
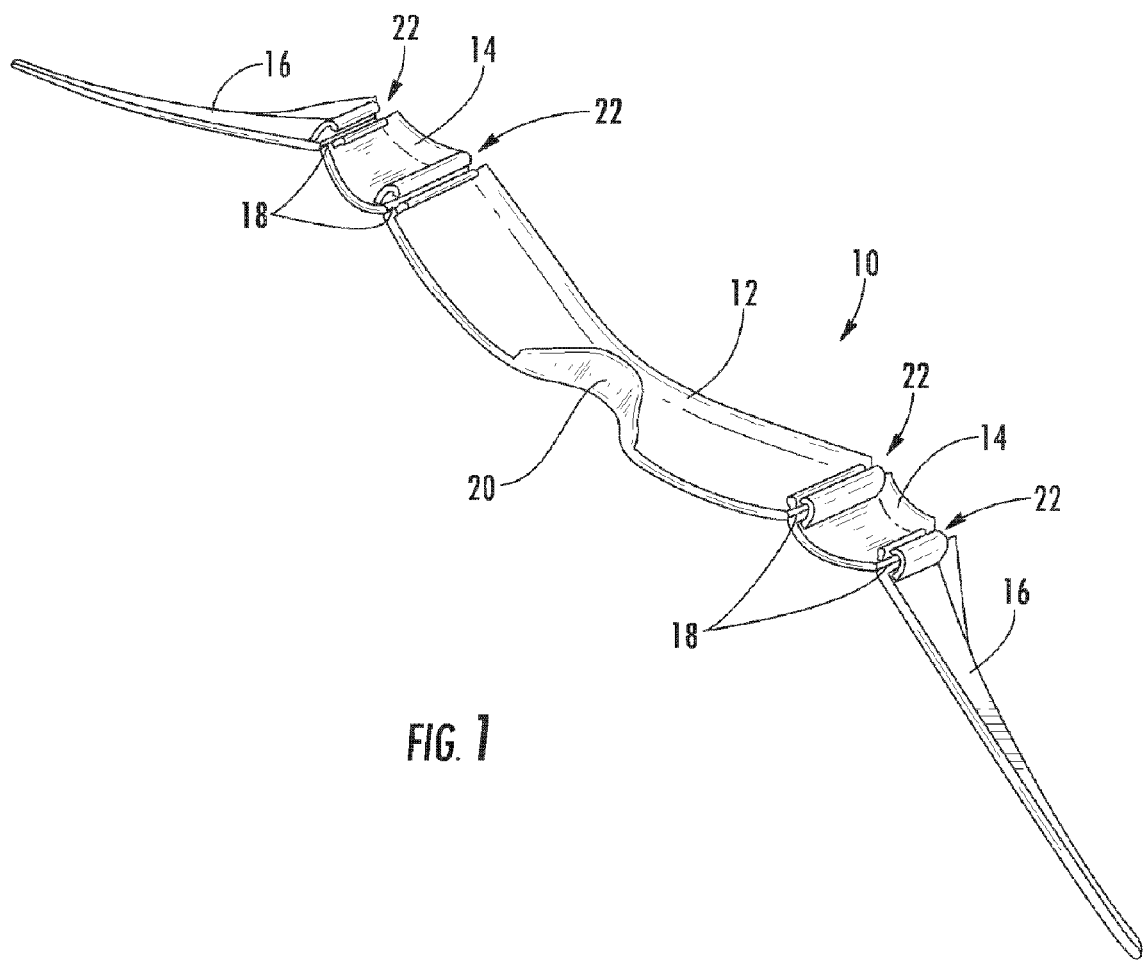
FIG. 1 is a perspective view of a first embodiment of the one-piece disposable safety eyewear constructed in accordance with the teachings of the present invention and viewed in an as-molded condition prior to folding for use.
Figure 2:
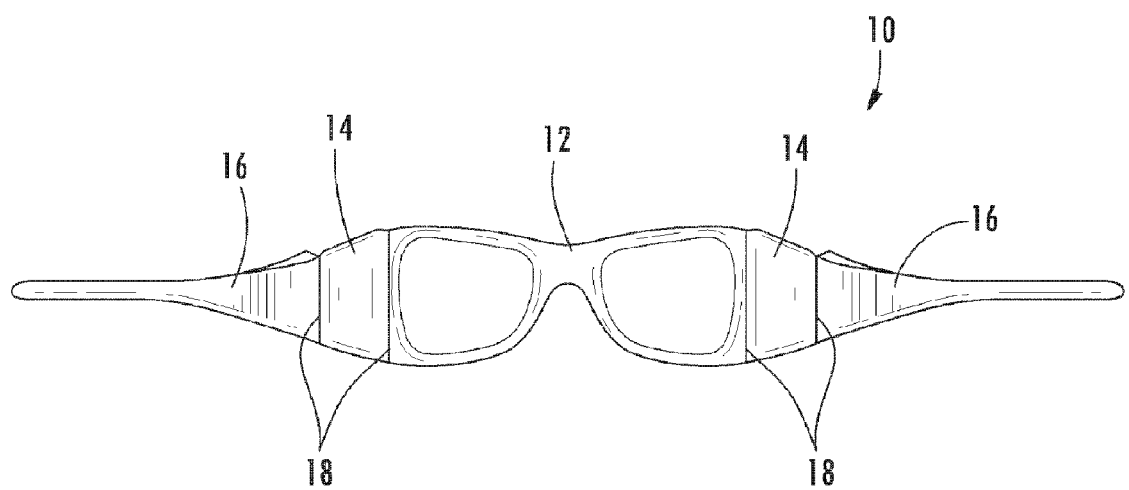
FIG. 2 is a front view thereof.
Figure 3:
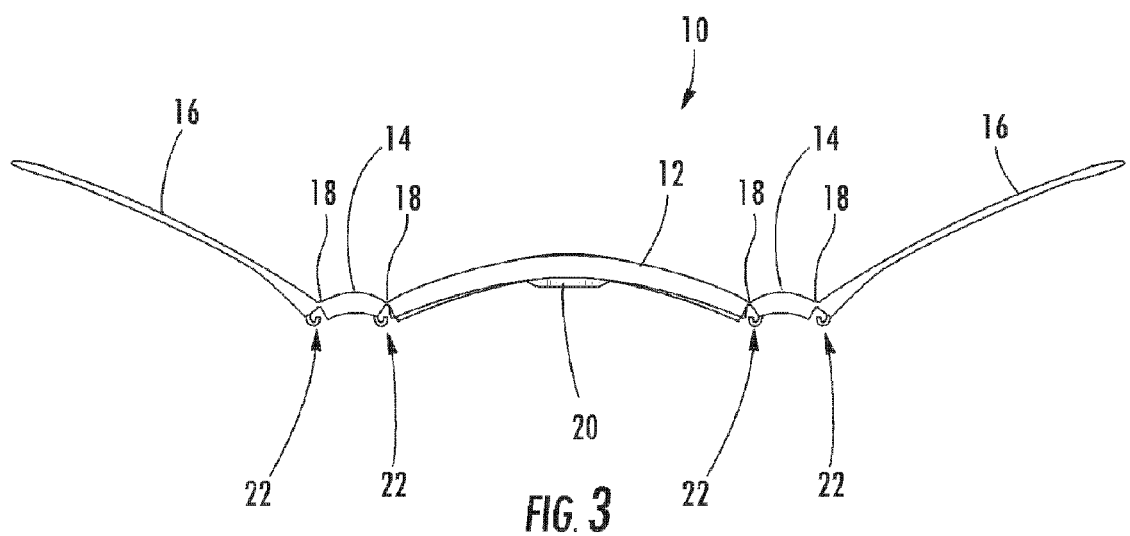
FIG. 3 is a top view thereof.

Referring now to the drawings, a first embodiment of the one-piece injection molded safety eyewear of the instant invention is illustrated and generally indicated at 10 in FIGS. 1–9. As will hereinafter be more fully described, the instant invention provides a simple and inexpensive one-piece, injection-molded, disposable safety eyewear product that does not require any assembly prior to shipment to the customer.

The entire eyewear 10 is molded in a substantially flat configuration as a single piece having the lens portion 12, side shield portions 14 and temple bars 16 integrally connected by reduced thickness parting lines 18 that define living hinges. The one-piece configuration is preferably molded from an optically transparent or translucent polycarbonate material, although other materials are possible. The lens portion 12 of the eyewear is configured and arranged as a single lens shield for protecting the user's eyes, and may include two separate lens areas 19 (See FIG. 5). The nose support 20 is integrally molded into the bridge of the lens portion 12.

Figure 4:
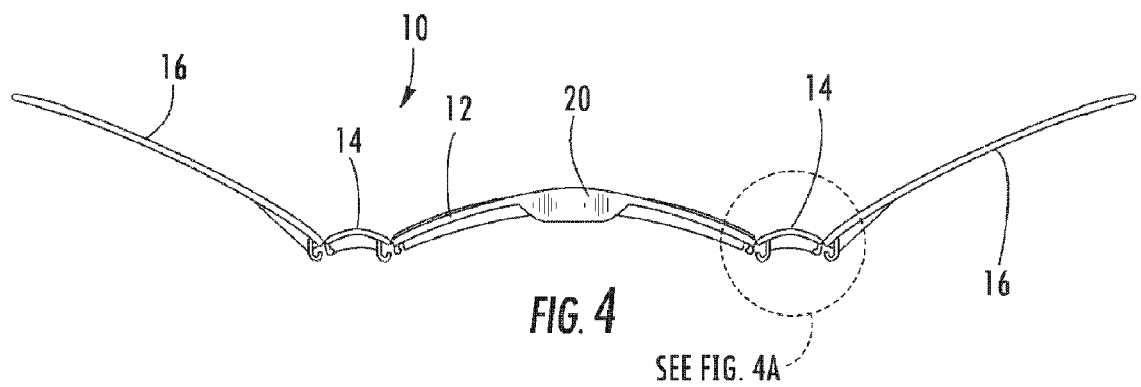
FIG. 4 is a bottom view thereof.
Figure 4A:
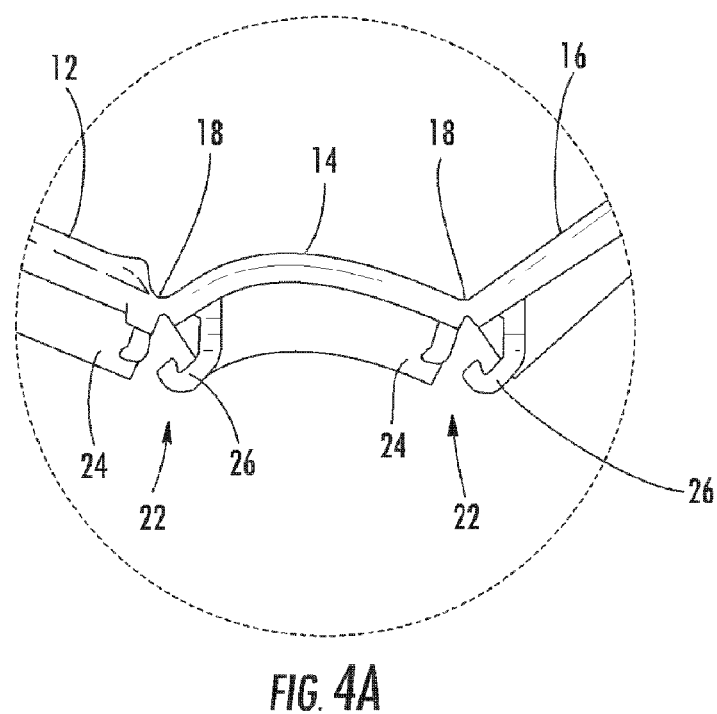
FIG. 4A is an enlarged cutaway of the bottom view showing the snap-in-place mating formations.
Figure 5:
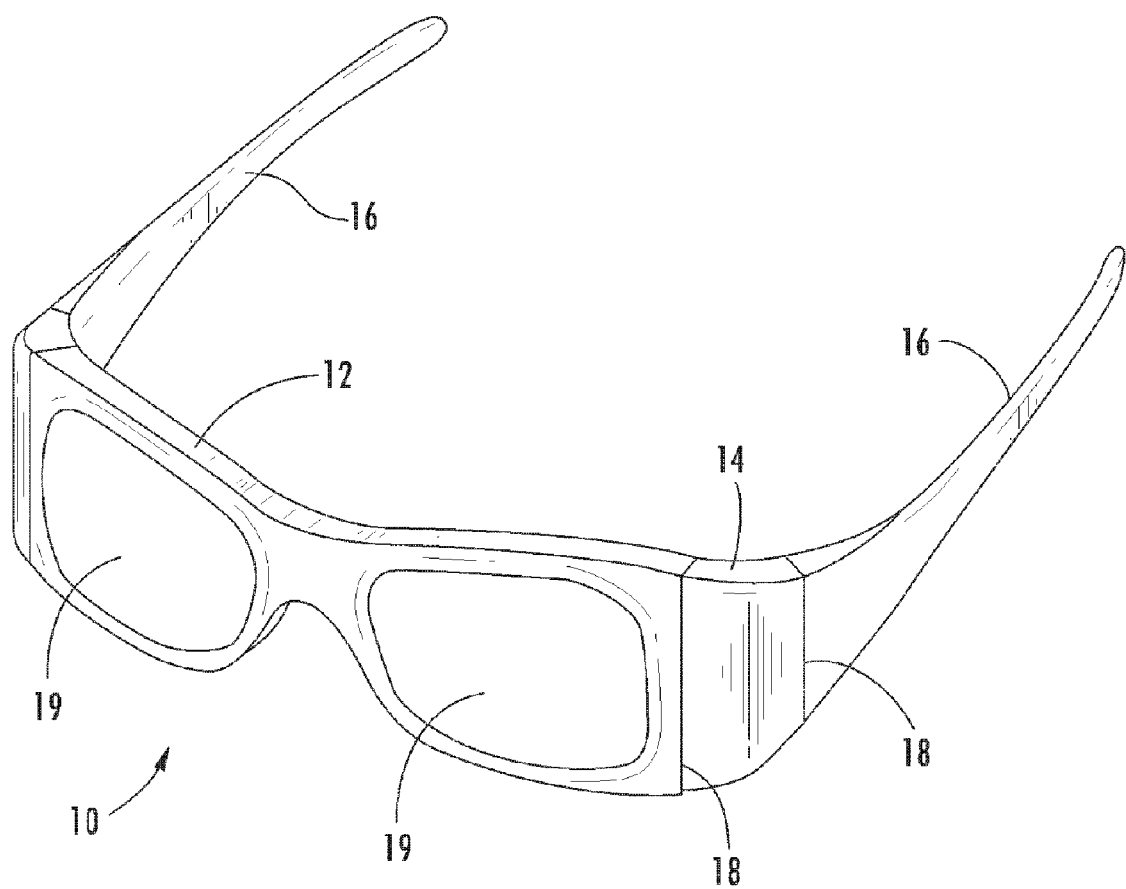
FIG. 5 is a front perspective view thereof showing the side shields and temple bars folded and snapped-in-place for use.
Figure 6:
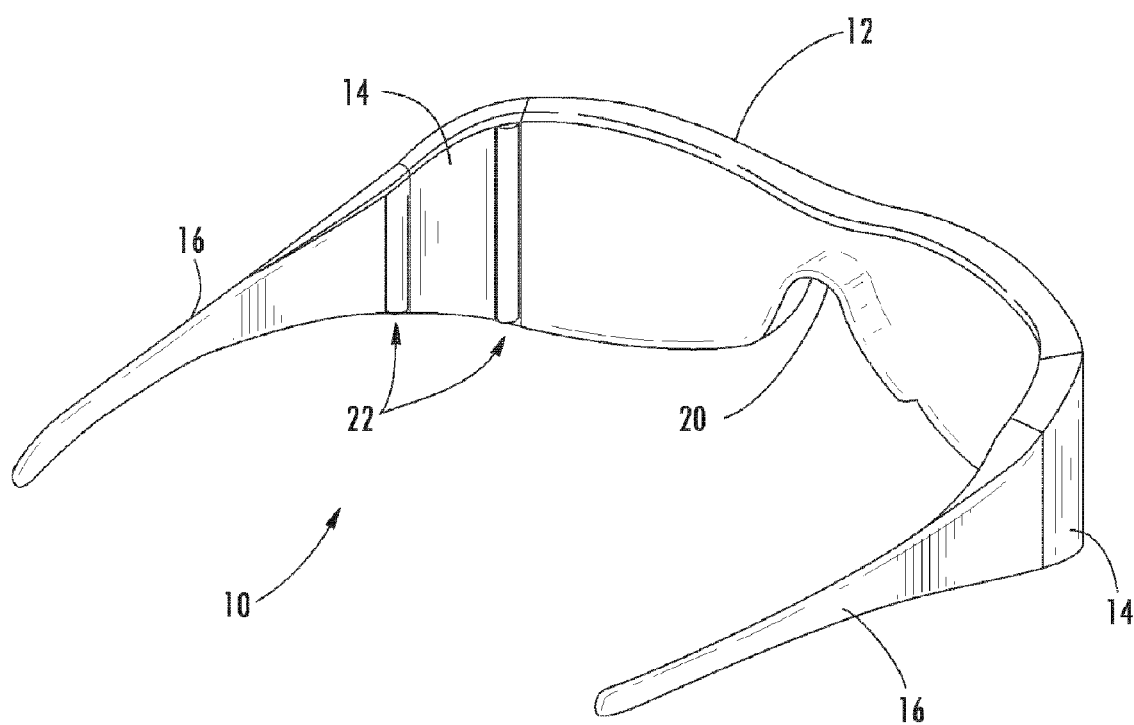
FIG. 6 is a rear perspective view thereof showing the side shields and temple bars folded and snapped-in-place for use.
Figure 7:
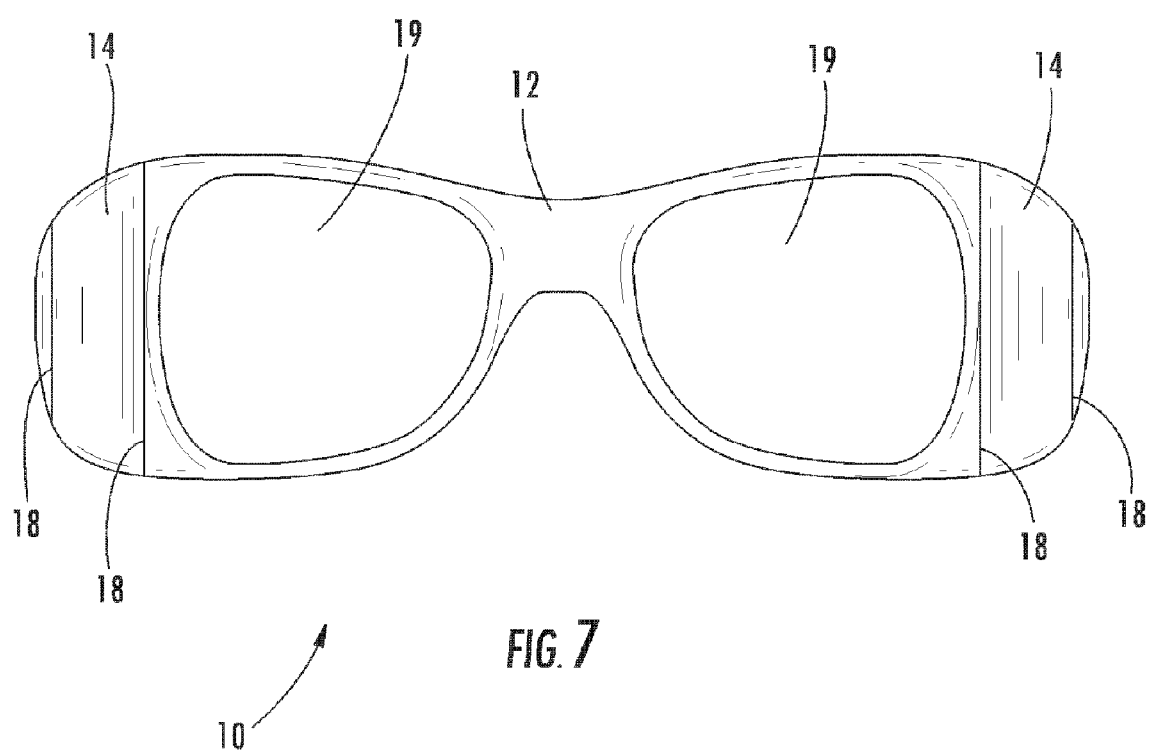
FIG. 7 is a front view thereof showing the side shields and temple bars folded and snapped-in-place for use.
Figure 8:
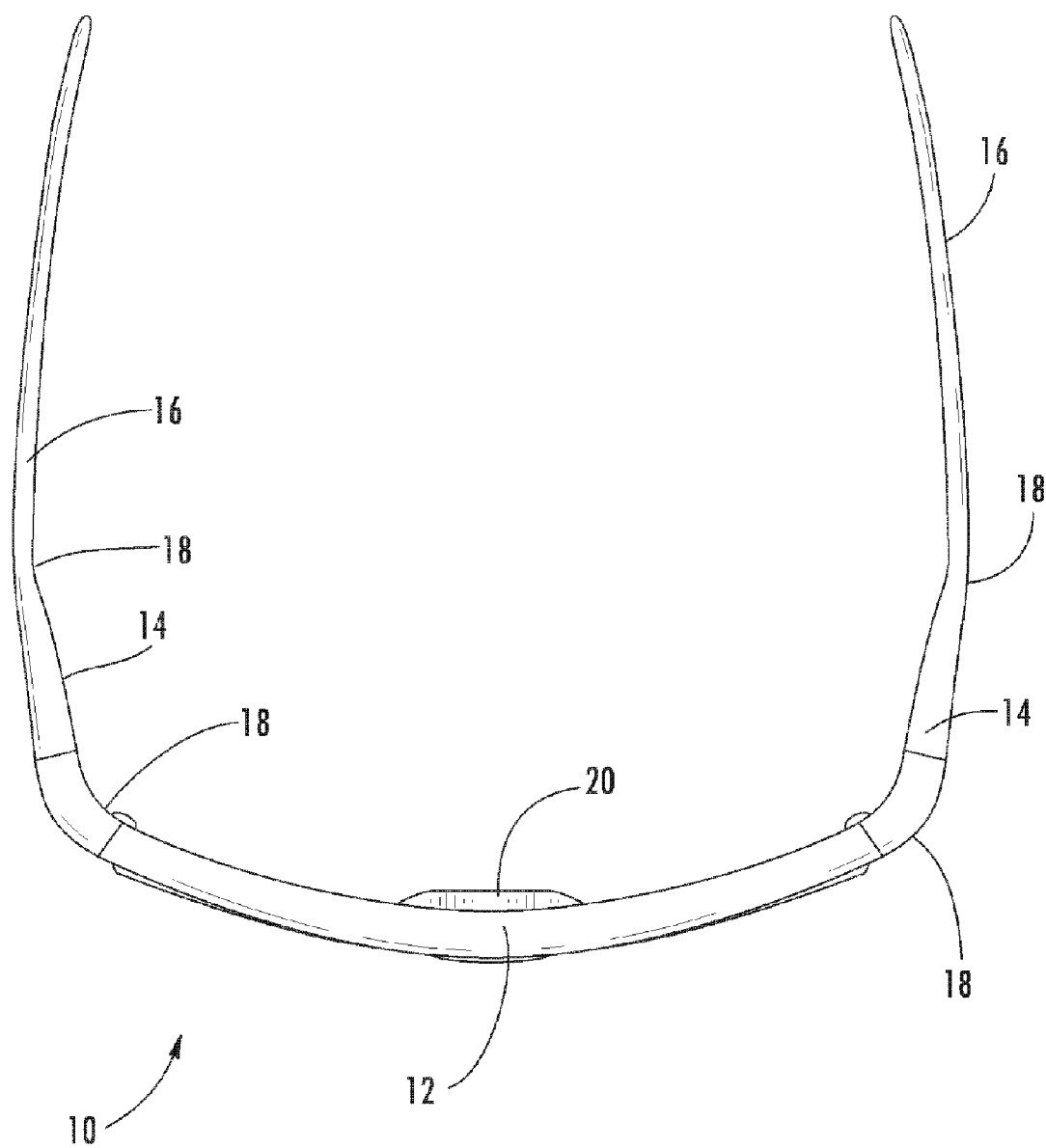
FIG. 8 is a top view thereof showing the side shields and temple bars folded and snapped-in-place for use.
Figure 9:
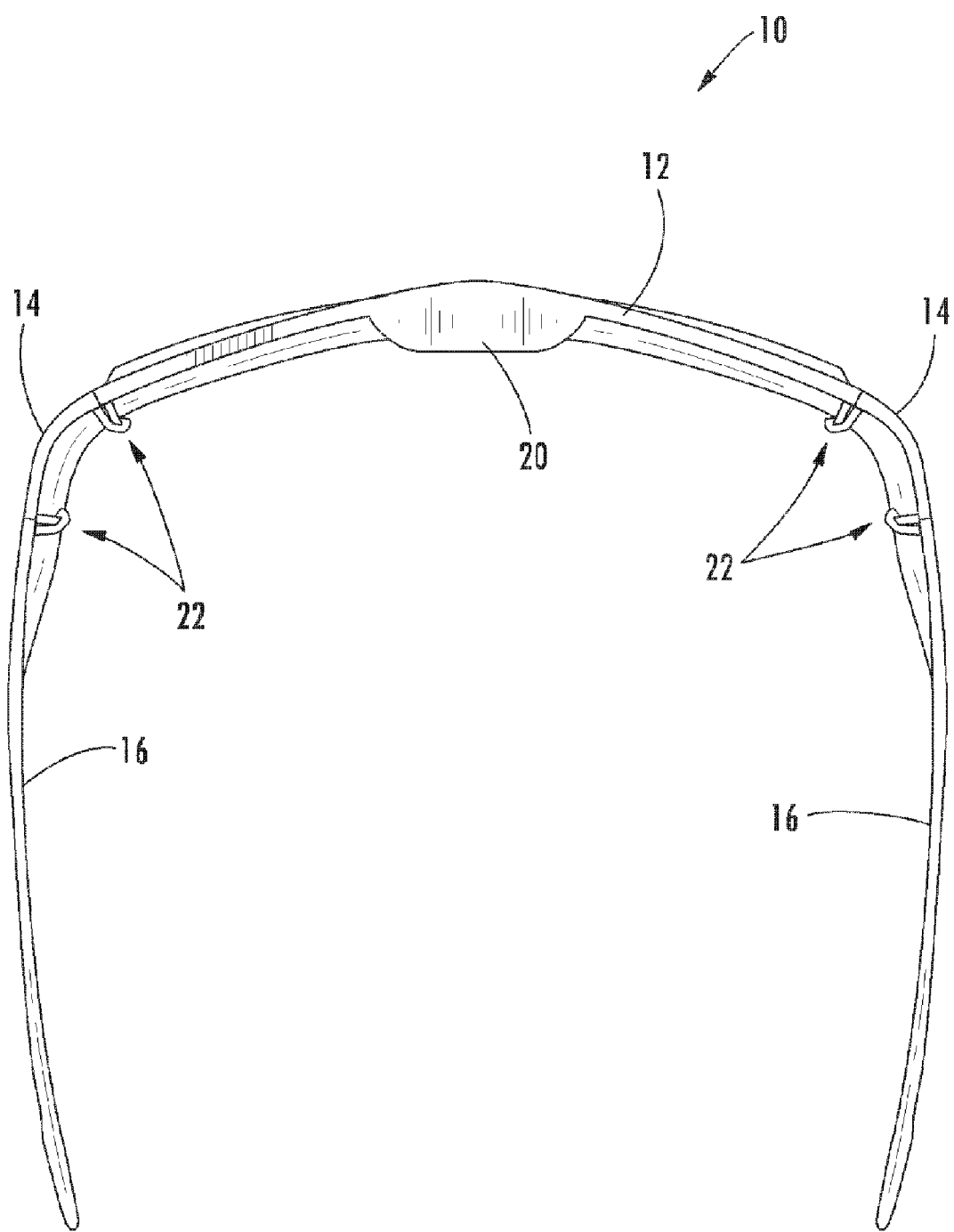
FIG. 9 is a bottom view thereof showing the side shields and temple bars folded and snapped-in-place for use.

The adjacent edges of the lens portion 12 and side shield portions 14 are integrally molded with one-way, snap-in-place mating formations generally indicated at 22. In the preferred embodiments illustrated herein, the snap-in-place formations comprise a raised shoulder 24 extending along one side of the hinge and a j-shaped channel hook 26 extending along the opposing side of the hinge (see FIG. 4A).

When the side shields 14 are pivoted toward the lens portion 12 along the living hinges 18, the mating formations snap together to lock the side shields 14 in place relative to the lens portion 12. More specifically, the lower leg portion of the J-shaped channel 24 slides over the top edge of the shoulder 22 and locks into an slight undercut provided along the length of the shoulder 22.

Likewise, the adjacent edges of the temple bars 16 and the side shields 14 also include the same snap-in-place mating formations 22 such that when the temple bars 16 are pivoted towards the side shields 14, the mating formations 22 snap together to lock the temple bars 16 in place relative to side shields 14.

The mating formations 22 snap together in a single direction, and are not intended to be snapped apart after use. Once snapped together, the eyewear 10 is intended to stay folded for use. However, it may be possible to construct the living hinges 18 and mating formations 22 such that repeated locking and unlocking would not excessively degrade the stability of the structure.

The one-piece design permits the safety eyewear 10 to be molded in a single shot, packaged in a flat low-profile box, and shipped without any assembly or subsequent processing steps by the manufacturer. At the point of distribution of the eyewear, the user removes the eyewear from the box, bends the side shields 14 and temple bars 16 into place, snapping the mating formations 22 together to form a conventional pair of safety eyewear.

By removing all of the secondary assembly processes (except packaging), labor and assembly machinery costs are significantly reduced and the manufacturer can provide a low cost, yet fully functional alternative to eyewear having multiple parts that must be assembled prior to shipment. Because of the low cost, the distributing site does not need to be concerned with collecting and cleaning safety eyewear that is provided for guests and visitors.

Figure 10:
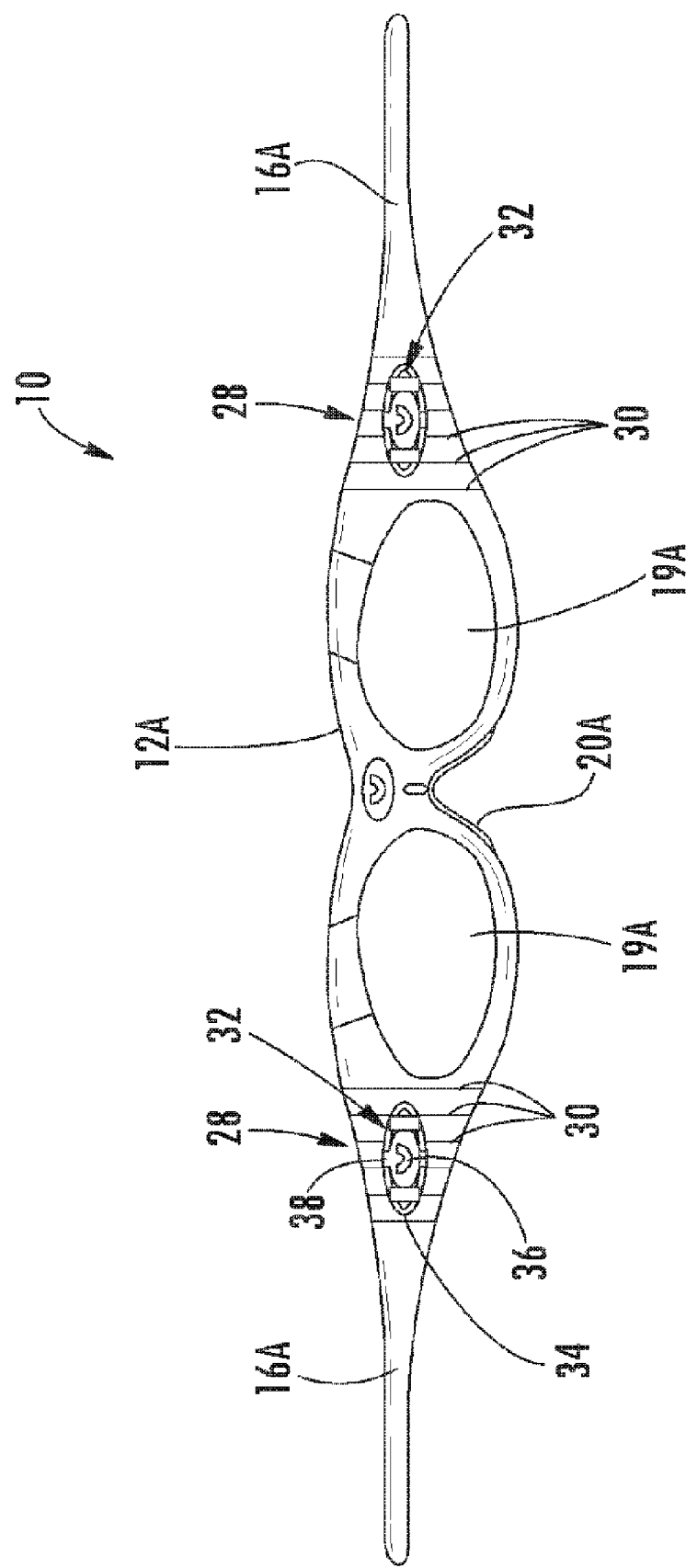
FIG. 10 is a front view of a second embodiment of the one-piece disposable safety eyewear constructed in accordance with the teachings of the present invention and viewed in an as-molded condition prior to folding for use.
Figure 11:
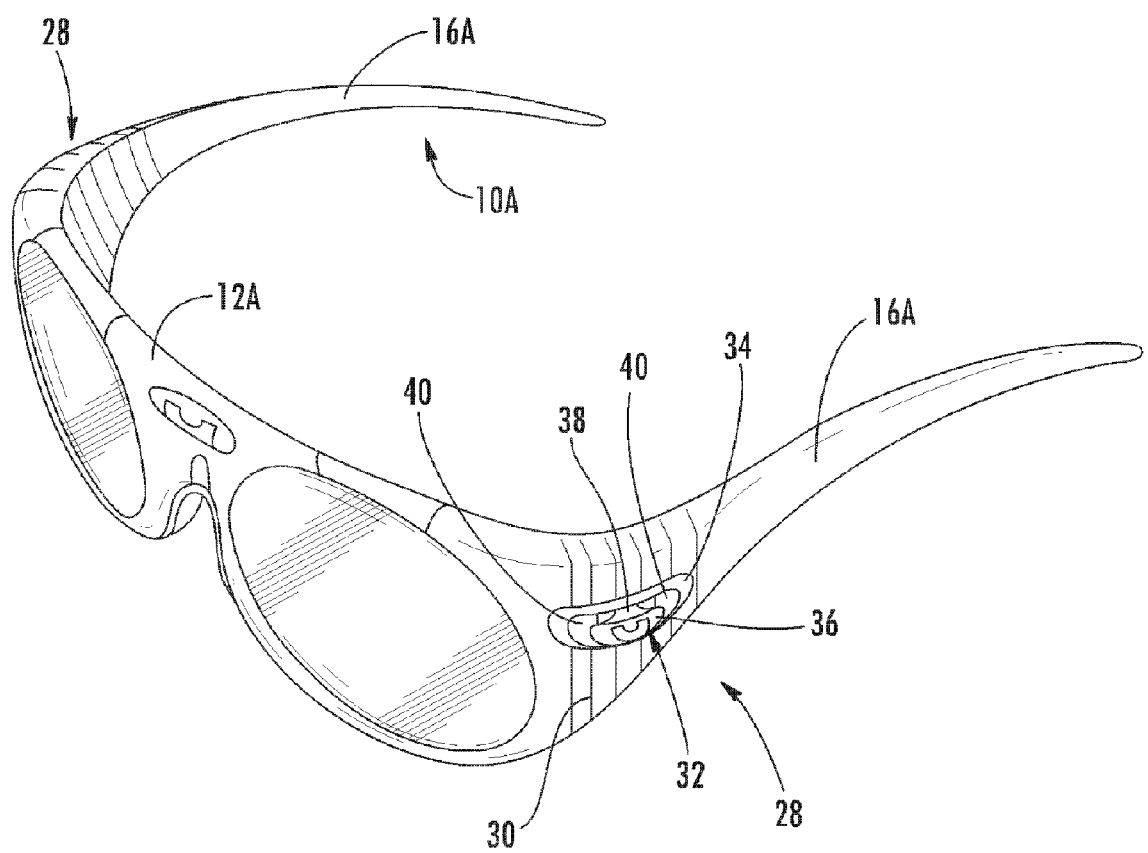
FIG. 11 is a front perspective view thereof showing the temple bars folded and snapped-in-place for use.
Figure 11A:
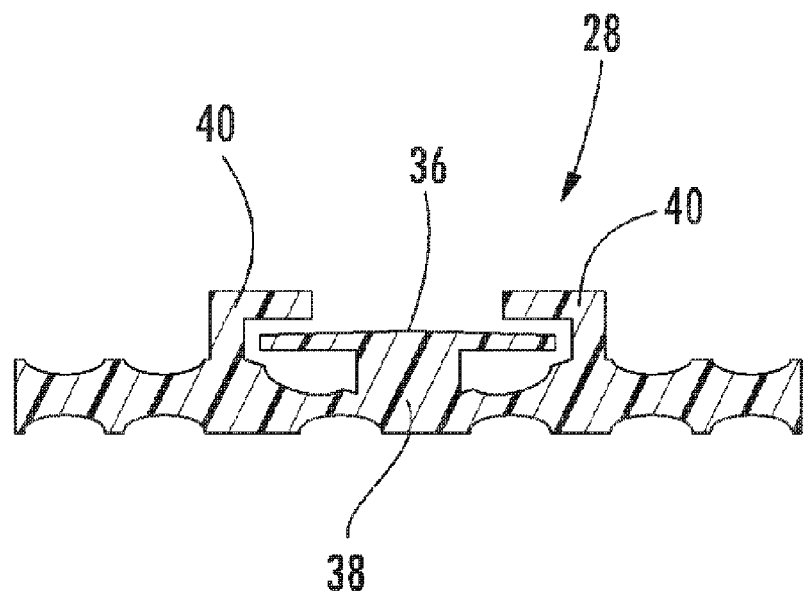
FIG. 11A is an enlarged detail view of the junction area showing the temple bar and mating snap-in-place formations prior to folding for use.
Figure 11B:
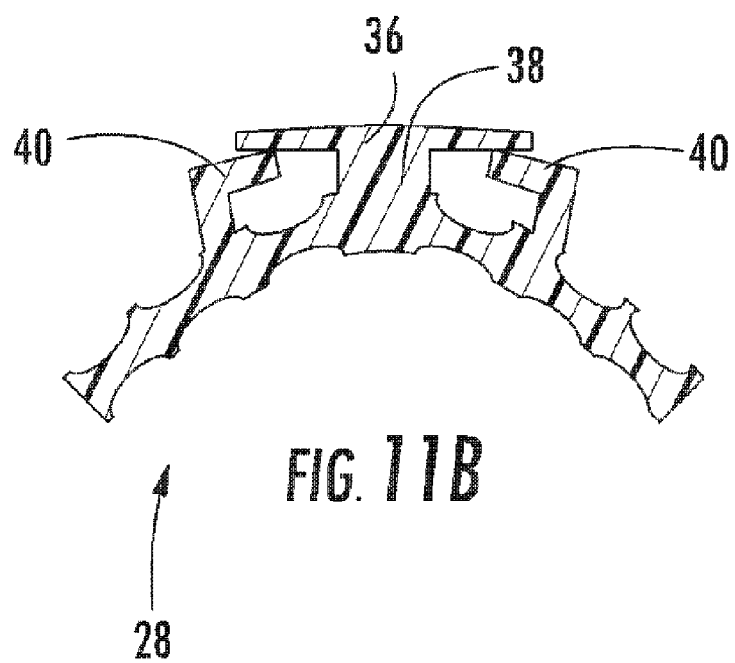
FIG. 11B is an enlarged detail view of the junction area showing the temple bar folded for use and the mating snap-in-place formations snapped in place.

Referring to FIGS. 10–11, a second embodiment of the one-piece design is generally indicated at 10A. The second embodiment 10A is in many respects similar to the first embodiment 10 described hereinabove. The second embodiment 10A also includes a lens portion 12A and opposing temple bars 16A. The temple bars 16A are each integrally connected to the lens portion 12A by temple junction generally indicated at 28 and including a plurality of closely-spaced, parallel reduced-thickness parting lines spaced between the lens portion 12A and the temple bars 16A. The plurality of parting lines form a series of living hinges 30 that allow the temple bars 16 to be bent in an arc (See direction arrows in FIGS. 11 and 11B) to a position substantially perpendicular to the lens portion 12A. The temple junctions 28 are each provided with snap-in-place mating formations generally indicated at 32 that snap together when the temple bars 16A are bent relative to the lens portion.

More specifically, the snap-in-place formations 32 comprise an oval opening 34 extending perpendicular to the living hinges 30 and a smaller dimensioned mating oval disc 36 that is integrally suspended in the middle of the opening 34 by connecting arms 38 at the top and bottom of the opening 34. The front and rear edges of the opening 34 include interference shoulders 40 that extend upwardly and partially inwardly over the top of the disc 36. When the temple bars 16A are bent along the series of living hinges 30, the disc 36 is forced upwardly past the interference shoulders 40 (See FIGS. 11A–11B). Once the disc 36 has moved past the interference shoulders 40, the shoulders 40 snap back into a locking position behind the disc (FIG. 11B) thereby preventing the disc 36 from passing back through the opening 34 and holding the temple bars 16A in the folded for use position.

It can therefore be seen that the present invention provides a simple and inexpensive one-piece, injection-molded, disposable safety eyewear product 10 that does not require any assembly prior to shipment to the customer. For these reasons, the instant invention is believed to represent a significant advancement in the art that has substantial commercial merit.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claim.

What is claimed is:

1. Eyewear, comprising:
    a lens portion having a bridge portion and a nose support thereon;
    a left temple bar connected to the lens portion by a first living hinge portion, the first living hinge portion operable between an open position and a folded position;
    a right temple bar connected to the lens portion by a second living hinge portion, the second living hinge portion operable between an open position and a folded position; and
    means for securing the first living hinge portion and the second living hinge portion in its respective folded position.

2. The eyewear of claim 1, wherein the means for securing comprises:
    first mating formations adjacent to the first living hinge portion; and
    second mating formations adjacent to the second living hinge portion.

3. The eyewear of claim 1, wherein the means for securing comprises:
    a first raised shoulder adjacent to the first living hinge portion;
    a first J-shaped channel hook extending along the opposing side of the first living hinge portion, the first J-shaped hook being snap-received onto the first raised shoulder when the first living hinge portion is operated to the folded position;

a second raised shoulder adjacent to the second living hinge portion;

a second J-Shaped channel hook extending along the opposing side of the second living hinge portion, the second J-shaped hook being snap-received onto the second raised shoulder when the second living hinge portion is operated to the folded position.

4. The eyewear of claim 1, wherein the means for securing comprises:

a first locking member integrally suspended in an aperture perpendicular to the first living hinge portion;

at least one left interference shoulder extending upwardly and partially inwardly over the top of the first locking member, the left interference shoulder snap-receiving the first locking member as the first living hinge portion is operated to its folded position;

a second locking member integrally suspended in an aperture perpendicular to the second living hinge portion; and at least one right interference shoulder extending upwardly and partially inwardly over the top of the second locking member, the right interference shoulder snap-receiving the second locking member as the second living hinge portion is operated to its folded position.

5. The eyewear of claim 1, wherein the first living hinge portion further comprises a plurality of parting lines spaced between the left temple bar and the lens portion, the parting lines acting as a series of living hinges.

6. The eyewear of claim 1, wherein the second living hinge portion further comprises a plurality of parting lines spaced between the right temple bar and the lens portion, the parting lines acting as a series of living hinges.

7. The eyewear of claim 1, wherein the eyewear is made of a transparent polycarbonate material.

8. The eyewear of claim 1, wherein the eyewear is made of a transparent acrylic material.

9. Eyewear, comprising:

a lens portion having a bridge portion and a nose support thereon;

a left side shield portion connected to the lens portion by a living hinge, the left side shield portion operable between an open position and a folded position;

a left temple bar connected to the left side shield by a living hinge, the left temple bar operable between an open position and a folded position;

a right side shield portion connected to the lens portion by a living hinge, the right side shield portion operable between an open position and a folded position;

a right temple bar connected to the lens portion by a living hinge, the right temple bar operable between an open position and an folded position; and means for securing the living hinges of the left side shield portion, left temple bar, right side shield portion and right temple bar in its respective folded position.

10. The eyewear of claim 9, wherein the means for securing comprises mating formations adjacent to each of the living hinges.

11. The eyewear of claim 9, wherein the means for securing comprises:

a plurality of raised shoulders adjacent to each of the living hinges;

a plurality of J-shaped channel hooks extending along the opposing sides of each of the living hinges, the plurality of J-shaped hooks being snap-received onto the plurality raised shoulders when the living hinges are operated to the folded positions.

12. The eyewear of claim 9, wherein the means for securing comprises:

a plurality locking members integrally suspended in a plurality of apertures perpendicular to each of the living hinges;

a plurality of interference shoulders extending upwardly and partially inwardly over the top of the plurality of locking members, the plurality of interference shoulders snap-receiving the plurality of locking members as the living hinges are operated to the folded positions.

13. The eyewear of claim 9, wherein the eyewear is made of a transparent polycarbonate material.

14. The eyewear of claim 9, wherein the eyewear is made of a transparent acrylic material.

15. Eyewear, comprising:

a lens portion having a bridge portion and a nose support thereon;

a left temple bar connected to the lens portion by a first living hinge portion, the first living hinge portion operable between an open position and a folded position;

a right temple bar connected to the lens portion by a second living hinge portion, the second living hinge portion operable between an open position and a folded position; and first mating formations adjacent to the first living hinge portion for securing the first living hinge portion in its folded position; and second mating formations adjacent to the second living hinge portion for securing the second living hinge portion in its folded position.

16. The eyewear of claim 15, wherein the eyewear is made of a transparent polycarbonate material.

17. The eyewear of claim 15, wherein the eyewear is made of a transparent acrylic material.

18. The eyewear of claim 15, wherein the first mating formations comprise:

a raised shoulder adjacent to the first living hinge portion; and a first J-shaped channel hook extending along the opposing side of the first living hinge portion, the first J-shaped hook being snap-received onto the first raised shoulder when the first living hinge portion is operated to the folded position.

19. The eyewear of claim 15, wherein the second mating formations comprise:

a second raised shoulder adjacent to the second living hinge portion;

a second J-Shaped channel hook extending along the opposing side of the second living hinge portion, the second J-shaped hook being snap-received onto the second raised shoulder when the second living hinge portion is operated to the folded position.

20. The eyewear of claim 15, wherein the first mating formations comprise:

a locking member integrally suspended in an aperture perpendicular to the first living hinge portion; and at least one interference shoulder extending upwardly and partially inwardly over the top of the locking member, the interference shoulder snap-receiving the locking member as the first living hinge portion is operated to its folded position.

21. The eyewear of claim 15, wherein the second mating formations comprise:

a locking member integrally suspended in an aperture perpendicular to the second living hinge portion; and at least one interference shoulder extending upwardly and partially inwardly over the top of the locking member, the interference shoulder snap-receiving the locking member as the second living hinge portion is operated to its folded position.

22. The eyewear of claim 15, wherein the first living hinge portion further comprises a plurality of parting lines spaced between the left temple bar and the lens portion, the parting lines forming a series of living hinges.

23. The eyewear of claim 15, wherein the second living hinge portion further comprises a plurality of parting lines spaced between the right temple bar and the lens portion, the parting lines forming a series of living hinges.

* * * * *